US008230338B2

(12) United States Patent
Dugan et al.

(10) Patent No.: US 8,230,338 B2
(45) Date of Patent: Jul. 24, 2012

(54) GAME DETERMINATION OF TAG RELEVANCE FOR SOCIAL BOOKMARKING

(75) Inventors: Casey Dugan, Medford, MA (US);
Michael Muller, Medford, MA (US);
Jerry W. Redman, Cedar Park, TX (US); Amy D. Travis, Arlington, MA (US); Sara Weber, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 12/017,058

(22) Filed: Jan. 21, 2008

(65) Prior Publication Data
US 2009/0187844 A1 Jul. 23, 2009

(51) Int. Cl.
*G06F 3/00* (2006.01)
(52) U.S. Cl. .......................... 715/712; 715/759; 715/771
(58) Field of Classification Search .................. 715/712, 715/759, 771
See application file for complete search history.

(56) References Cited

U.S. PATENT DOCUMENTS

| 7,756,924 B2 * | 7/2010 | Kaler ............................. 709/204 |
| 2006/0277091 A1 * | 12/2006 | Kochikar et al. ............... 705/10 |
| 2007/0123204 A1 * | 5/2007 | Inukai ........................... 455/403 |
| 2008/0046458 A1 * | 2/2008 | Tseng et al. ................... 707/102 |
| 2009/0049408 A1 * | 2/2009 | Naaman et al. ............... 715/835 |
| 2009/0171967 A1 * | 7/2009 | Ceglowski ..................... 707/10 |

* cited by examiner

*Primary Examiner* — Dennis Bonshock
(74) *Attorney, Agent, or Firm* — Steven M. Greenberg, Esq.; Carey, Rodriguez, Greenberg & O'Keefe

(57) ABSTRACT

Embodiments of the present invention provide a method, system and computer program product for game determined tag relevance for social bookmarking. In one embodiment of the invention, a method for the game determination of tag relevance for social bookmarking can be provided. The method can include rendering a game user interface in connection with content in a content browser, providing a list of tags previously associated with the content in the game user interface for a game participant and receiving relevance values for the tags through the game user interface provided by the game participant for each of the tags, comparing the relevance values to relevance values provided by others to generate a score and presenting the score in the game user interface, and applying the received relevance values to the tags to improve quality for each of the tags in association with the content.

21 Claims, 1 Drawing Sheet ly pointed out in the appended claims. It is to be understood
GAME DETERMINATION OF TAG RELEVANCE FOR SOCIAL BOOKMARKING

BACKGROUND OF THE INVENTION

1. Field of the Invention

The present invention relates to the field of bookmarking content and more particularly to social bookmarking.

2. Description of the Related Art

Content browsing refers to the retrieval and presentation of electronic content in a browser client. Content generally can include electronic documents, messages, audio, audiovisual and video materials and imagery. Most commonly, content can be stored in a server environment and published for access by content consumers over a computer communications network such as the global Internet. Content consumers, in turn, can retrieve content over the network by reference to a network address for the content. Once retrieved, the content can be presented in a browser client including not only conventional visual browsers such as the venerable Web browser, but also in alternative browsers such as those deployed in pervasive devices and those supporting different modes of presentation such as the audible presentation of material.

Given the vast amount of content published for retrieval over the Internet, modern content browsers provide a mechanism for ably retrieving previously accessed content. Known as a "bookmark" or "favorite" (collectively referred to as a bookmark), end users can record content of interest as a bookmark. Subsequently, end users can access a list of bookmarks in order to recall the content of interest without being compelled to recall from memory the precise uniform resource indicator (URI) for the content of interest.

While bookmarking reflects the personal experience of individual users, social bookmarking provides a foundation for users within a social group to store, organize, share and search the bookmarks collectively established by the users within the social group. In the operation of a social bookmarking system, users save links to memorable content. Unlike traditional bookmarks however, in a social bookmarking system the links subsequently can be published for public inspection and use so as to provide a communal repository of bookmarks. Consequently, groups of the users can access the links encapsulated within respective social bookmarks, though the groups of users in fact may never have viewed the associated content—a prerequisite for a traditional bookmark.

Social bookmarking services often encourage users in a social network to annotate bookmarks with meta-information referred to as "tags" rather than merely storing bookmarks in a traditional file hierarchy. As such, users processing tags for a social bookmark can view the social bookmark for content along with the tag pertaining to the bookmark, for instance if a number of users having bookmarked the content. Further, some social bookmarking services infer clusters of bookmarks from the relationship of corresponding tags. Finally, many social bookmarking services provide subscription based feeds for lists of bookmarks, including lists organized by tags. Consequently, subscribers can become aware of new bookmarks as the bookmarks are saved, shared, and tagged by other users.

Despite the promise of social bookmarking, content oftentimes fails to enjoy the benefits of social bookmarking. As an example, bookmarked content lacking a substantial number of meaningful tags can evade notice by other, unfamiliar users. Likewise, tags specified by too few users for bookmarked content can result in little consideration being provided to the content. Thus, the success or failure of social bookmarking for content depends largely on the quality and quantity of tags provided for socially bookmarked content.

BRIEF SUMMARY OF THE INVENTION

Embodiments of the present invention address deficiencies of the art in respect to social bookmarking and provide a novel and non-obvious method, system and computer program product for game determined tag relevance for social bookmarking. In one embodiment of the invention, a method for the game determination of tag relevance for social bookmarking can be provided. The method can include rendering a game user interface in connection with content in a content browser, providing a list of tags previously associated with the content in the game user interface for a game participant and receiving relevance values for the tags through the game user interface provided by the game participant for each of the tags, comparing the relevance values to relevance values provided by others to generate a score and presenting the score in the game user interface, and applying the received relevance values to the tags to improve quality for each of the tags in association with the content.

In another embodiment of the invention, a social bookmarking data processing system can be provided. The system can include a social bookmarking system coupled to a data store of tags, and a tag game coupled to the social bookmarking system. The tag game can include program code enabled to generate a game user interface including a list of tags from the data store of tags previously associated with content. The program code further can be enabled to receive relevance values for the tags through the game user interface for each of the tags, to compare the relevance values to relevance values provided by others to generate a score and presenting the score in the game user interface, and to apply the received relevance values to the tags. Further, the game user interface can provide a tag entry field programmed to accept a new tag to be associated with the content.

In one aspect of the embodiment, the game user interface can include a target portions of which represent different relevance values, and iconic representations of tags such that each tag can be assigned a relevance value by dragging and dropping the iconic representation onto the portion of the target corresponding to a desired relevance value. By way of example, the iconic representations can be different graphical images of darts, each corresponding to a tag in the list of tags. Additionally, the target can include a bulls-eye in which each portion of the bulls-eye corresponds to a different relevance value. As such, both the darts and the bulls-eye can be configured for drag-and-drop operations to apply a relevance value to a tag corresponding to a dragged and dropped dart onto a portion of the bulls-eye.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the game determination of tag relevance for social bookmarking. In accordance with an embodiment of the present invention, a game participant can be presented with content in a content browser and prompted with different tags for the content. The game participant can rate the different tags according to a degree of relevance for the content. Optionally, the game participant can add new tags for the content. Thereafter, the ratings can be compared to ratings applied by other users to the content in order to score the end user. The ratings, however, can be combined with the ratings by other users in order to improve the quality of the tags for the content. Further, new tags provided by the game participant can be added to the tags for the content in order to improve the quantity of the tags for the content.

Figure 1:
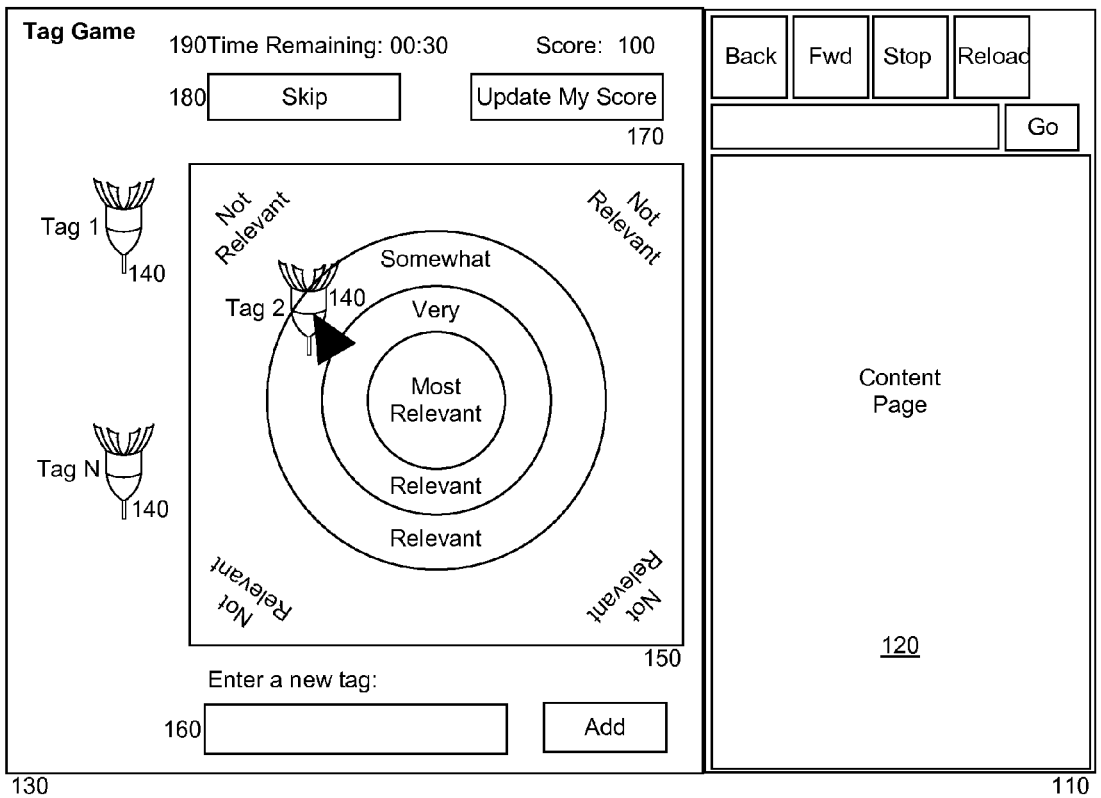
FIG. 1 is a pictorial illustration of a game interface for determining tag relevance for social bookmarking.

In further illustration, FIG. 1 is a pictorial illustration of a game interface for determining tag relevance for social bookmarking. As shown in FIG. 1 content 120 such as a Web page can be provided for viewing by a participant in a content browser 110. A game user interface 130 can be rendered in connection with the content 120 for interaction by the participant. The game user interface 130 can include a listing of tags 140 previously associated with the content 120. In this regard, the tags 140 can be tags that had been previously applied by prior viewers of the content 120, or the tags 140 can be computer generated tags, or both.

Each of the tags 140 can be assigned a relevance value by the participant. The assignment of a relevance value can be performed through the manual entry of a relevance value, or as shown in FIG. 1, the participant can drag-and-drop an iconic representation of each tag 140 onto a corresponding relevance in a relevance target 150—as illustrated, a series of concentric rings in a bulls-eye arrangement. To the extent that the participant desires to add additional tags of relevance, the participant can do so in tag entry field 160. The relevance values assigned to each tag 140 can be compared to those values previously applied by other user in order to generate a score. The score can be updated by selection of score update control 170.

The "game" as illustrated in FIG. 1 can be time limited in that a participant can be expected to complete an assignment of relevance values for each of the tags within a specified period of time indicated by timer 190. Optionally, the participant can set the timer manually so as to be reminded when to stop playing the game, such as a user who plays the game as a "break" from work Once complete, different content 120 can be presented in the content browser 110. To the extent the participant elects not to "play the game" in connection with content 120 presented in the content browser 110, the participant can skip to new content 120 through selection of the skip control 180.

Of note, the sequence of content 120 provided for viewing in the content browser 110 can be pre-selected according to a static list, presumably including content not enjoying a desirable quantity of tags or a desirable quality of tags reflecting a depth of agreement by different users. The content can be matched to content likely to be enjoyed by the participant in comparison to a social profile for the participant. Specifically, tags associated with the game participant as derived from the social bookmarks of the game participant or previous tag-based searches directed by the game participant can be matched to the content. Further, content previously presented to the participant can be tracked and previously viewed content can be omitted from the sequence.

Figure 2:
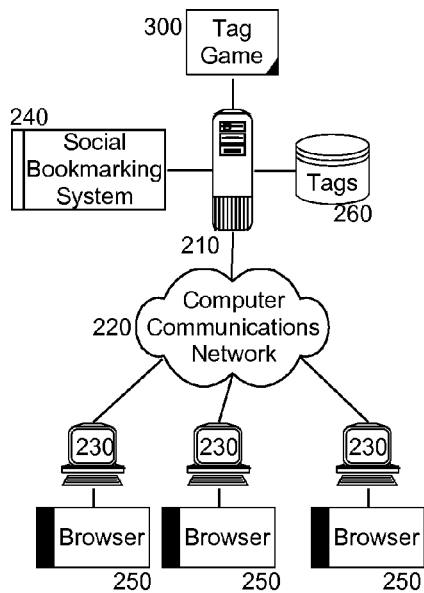
FIG. 2 is a schematic illustration of a social bookmarking data processing system configured for game determination of tag relevance; and, FIG. 3 is a flow chart illustrating a process for game determining tag relevance for social bookmarking.

The game as set forth in FIG. 1 can be implemented in connection with a social bookmarking data processing system. In illustration, FIG. 2 schematically shows a social bookmarking data processing system configured for game determination of tag relevance. The system can include a host server 210 configured for communicative coupling to clients 230 over computer communications network 220. The host server 210 can support the operation of a social bookmarking system 240 managing tags 260 for content on behalf of different users of the social bookmarking system 240 interacting with the social bookmarking system 240 through respective content browsers 250.

Notably, a tag game 300 can be coupled to the social bookmarking system 240 by way of the host server 210. The tag game 300 can include program code enabled to present both content and a game user interface to a game participant in a content browser 250. The game user interface can present a set of tags previously associated with content. Thereafter, the game participant can rate the different tags according to a degree of relevance for the content. Optionally, the game participant can add new tags for the content. The ratings, in turn, can be compared to ratings applied by other users to the content in order to score the end user. The ratings, however, can be combined with the ratings by other users in order to improve the quality of the tags for the content. Further, new tags provided by the game participant can be added to the tags for the content in order to improve the quantity of the tags for the content.

Figure 3:
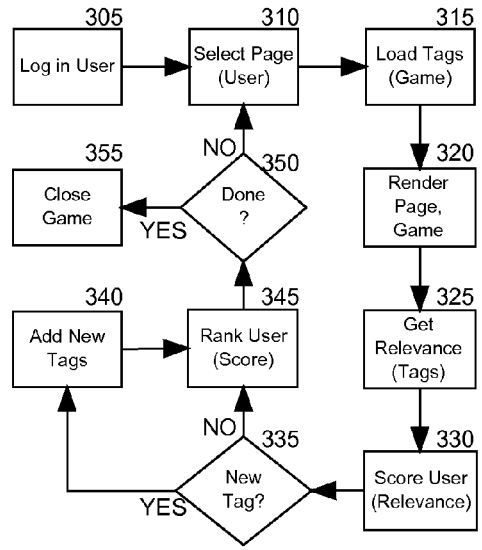

In further illustration of the operation of the tag game 300, FIG. 3 is a flow chart illustrating a process for game determining tag relevance for social bookmarking. Beginning in block 305, a game participant can log in to the social bookmarking system and in block 310, content such as a Web page or a Web page resource can be selected for presentation to the game participant. In block 315, tags previously applied to the content can be loaded for use in the game and in block 320, the selected page can be loaded in connection with a tag game user interface. In particular, the tag game user interface can include a listing of the tags and a target into which the tags can be placed to indicate a relevance value for each of the tags.

In block 325, relevance values can be collected for each of the tags in the game user interface as applied by the game participant. (Optionally, additional tags can be specified by the game participant in respect to the content). In block 330, the relevance values applied by the game participant can be compared to the relevance values applied by others in order to produce a score for the game participant. In decision block 335, if the game participant has added one or more new tags for the content, in block 340 the new tag or tags can be added to the list of tags associated with the content. Subsequently, in block 345 the game participant can be ranked in comparison to other game participants based upon the computed score. Finally, in decision block 350 if the game participant chooses to continue playing the process can repeat through block 310. Otherwise the process can end in block 355 with the termination of the game.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for game determining tag relevance for social bookmarking, the method comprising:
    rendering a game user interface in connection with content in a content browser;
    providing a list of tags previously associated with the content in the game user interface for a game participant and receiving relevance values for the tags through the game user interface provided by the game participant for each of the tags;
    comparing the relevance values to relevance values provided by others to generate a score for the game participant and presenting the score in the game user interface; and,
    applying the received relevance values to the tags to improve quality for each of the tags in association with the content.

2. The method of claim 1, further comprising:
    receiving a specification of a new tag in association with the content; and,
    adding the new tag to the tags in association with the content to improve a quantity of tags associated with the content.

3. The method of claim 1, further comprising repeating the providing, comparing and applying for a sequence of content.

4. The method of claim 3, further comprising determining the sequence of content by selecting content matching aspects of a social profile for the game participant.

5. The method of claim 3, further comprising determining the sequence of content by selecting content matching tags associated with the game participant as derived either from the social bookmarks of the game participant or from previous tag-based searches directed by the game participant.

6. The method of claim 3, further comprising determining the sequence of content by omitting content previously viewed in the game user interface by the game participant.

7. The method of claim 3, further comprising determining the sequence of content by determining which content has fewer associated tags than a threshold number of tags.

8. The method of claim 1, wherein receiving relevance values for the tags through the game user interface provided by the game participant for each of the tags, comprises receiving relevance values for the tags through the game user interface provided by the game participant for each of the tags within a time limit imposed by the game user interface.

9. The method of claim 1, wherein providing a list of tags previously associated with the content in the game user interface for a game participant and receiving relevance values for the tags through the game user interface provided by the game participant for each of the tags, comprises:
    displaying the list of tags each as a dart; and,
    dragging and dropping each dart onto a portion of a bullseye to indicate a relevance value for a corresponding tag.

10. A social bookmarking data processing system comprising:
    a social bookmarking system executing in memory by a processor of a computer and coupled to a data store of tags; and,
    a tag game coupled to the social bookmarking system, the tag game comprising program code enabled to generate a game user interface comprising a list of tags from the data store of tags previously associated with content, the program code being further enabled to receive relevance values for the tags through the game user interface for each of the tags, to compare the relevance values to relevance values provided by others to generate a score for the game participant and presenting the score in the game user interface, and to apply the received relevance values to the tags.

11. The system of claim 10, wherein the game user interface further comprises a tag entry field programmed to accept a new tag to be associated with the content.

12. The system of claim 10, wherein the game user interface comprises:
    a plurality of iconic representations of tags; and,
    a target, each portion of the target corresponding to a different relevance value, both the iconic representations and the target being configured for drag-and-drop operations to apply a relevance value to a tag corresponding to a dragged and dropped iconic representation onto a portion of the target.

13. A computer program product comprising a computer usable storage medium storing computer usable program code for game determining tag relevance for social bookmarking, the computer program product comprising:

computer usable program code for rendering a game user interface in connection with content in a content browser;

computer usable program code for providing a list of tags previously associated with the content in the game user interface for a game participant and receiving relevance values for the tags through the game user interface provided by the game participant for each of the tags;

computer usable program code for comparing the relevance values to relevance values provided by others to generate a score for the game participant and presenting the score in the game user interface; and, computer usable program code for applying the received relevance values to the tags to improve quality for each of the tags in association with the content.

14. The computer program product of claim 13, further comprising:

computer usable program code for receiving a specification of a new tag in association with the content; and, computer usable program code for adding the new tag to the tags in association with the content to improve a quantity of tags associated with the content.

15. The computer program product of claim 13, further comprising computer usable program code for repeating the providing, comparing and applying for a sequence of content.

16. The computer program product of claim 15, further comprising computer usable program code for determining the sequence of content by selecting content matching aspects of a social profile for the game participant.

17. The computer program product of claim 15, further comprising computer usable program code for determining the sequence of content by selecting content matching tags associated with the game participant as derived either from the social bookmarks of the game participant or from previous tag-based searches directed by the game participant.

18. The computer program product of claim 15, further comprising computer usable program code for determining the sequence of content by omitting content previously viewed in the game user interface by the game participant.

19. The computer program product of claim 15, further comprising computer usable program code for determining the sequence of content by determining which content has fewer associated tags than a threshold number of tags.

20. The computer program product of claim 13, wherein the computer usable program code for receiving relevance values for the tags through the game user interface provided by the game participant for each of the tags, comprises computer usable program code for receiving relevance values for the tags through the game user interface provided by the game participant for each of the tags within a time limit imposed by the game user interface.

21. The computer program product of claim 13, wherein the computer usable program code for providing a list of tags previously associated with the content in the game user interface for a game participant and receiving relevance values for the tags through the game user interface provided by the game participant for each of the tags, comprises:

computer usable program code for displaying the list of tags each as a dart; and, computer usable program code for dragging and dropping each dart onto a portion of a bulls-eye to indicate a relevance value for a corresponding tag.

* * * * *